United States Patent
Wier

[19]

[11] Patent Number: 6,095,615
[45] Date of Patent: *Aug. 1, 2000

[54] OCCUPANT RESTRAINT SYSTEM WITH A BELT PRETENSIONER

[75] Inventor: Franz Wier, Göggingen, Germany

[73] Assignee: TRW Occupant Restraint Systems GmbH, Alfdorf, Germany

[ * ] Notice: This patent issued on a continued prosecution application filed under 37 CFR 1.53(d), and is subject to the twenty year patent term provisions of 35 U.S.C. 154(a)(2).

[21] Appl. No.: 08/820,141

[22] Filed: Mar. 19, 1997

[30] Foreign Application Priority Data

Mar. 28, 1996 [DE] Germany ................. 296 05 818 U

[51] Int. Cl.⁷ .......................... A62B 35/01; B60R 21/00; B60R 22/04; B60R 22/36; B60R 22/46
[52] U.S. Cl. ................................. 297/480; 297/482
[58] Field of Search ....................... 297/480, 482, 297/468; 280/806

[56] References Cited

U.S. PATENT DOCUMENTS

| | | | |
|---|---|---|---|
| 4,422,669 | 12/1983 | Chiba et al. | 297/480 X |
| 4,458,921 | 7/1984 | Chiba et al. | 280/806 |
| 5,290,062 | 3/1994 | Föhl | 297/480 X |
| 5,313,690 | 5/1994 | Hiramatsu et al. | 297/480 X |
| 5,374,110 | 12/1994 | Hiramatsu et al. | 297/480 X |
| 5,450,723 | 9/1995 | Föhl | 297/480 X |
| 5,519,997 | 5/1996 | Specht | 297/480 X |
| 5,538,284 | 7/1996 | Nishide et al. | 297/480 X |
| 5,568,940 | 10/1996 | Lane, Jr. | 297/480 X |
| 5,588,677 | 12/1996 | Kopetzky et al. | 297/480 X |
| 5,607,185 | 3/1997 | Isaji et al. | 297/480 X |
| 5,634,690 | 6/1997 | Watanabe et al. | 297/480 |
| 5,651,564 | 7/1997 | Tsaji et al. | 297/480 X |
| 5,671,949 | 9/1997 | Bauer et al. | 297/480 X |
| 5,703,657 | 12/1997 | Maruoka et al. | |

FOREIGN PATENT DOCUMENTS

| | | |
|---|---|---|
| 940427221 | 5/1994 | Germany . |
| 5138833 | 3/1976 | Japan . |
| 6156188 | 6/1994 | Japan . |
| 6171459 | 6/1994 | Japan . |

*Primary Examiner*—Peter M. Cuomo
*Assistant Examiner*—Rodney B. White
*Attorney, Agent, or Firm*—Tarolli, Sunheim, Covell, Tummino & Szabo L.L.P.

[57] ABSTRACT

A vehicle occupant restraint system includes a belt pretensioner with a belt pretensioner housing, a belt link element with a housing, a tension transmission element coupling the belt pretensioner and the belt link element with each other, a tubular body which encompasses the tension transmission element outside the belt pretensioner housing, and a stationary counterpart. The stationary counterpart has a curved guide. The belt pretensioner displaces the belt link element via the tension transmission element in the event of a collision upon actuation of the belt pretensioner, so that the tubular body penetrates into the a curved guide and is bent.

12 Claims, 2 Drawing Sheets

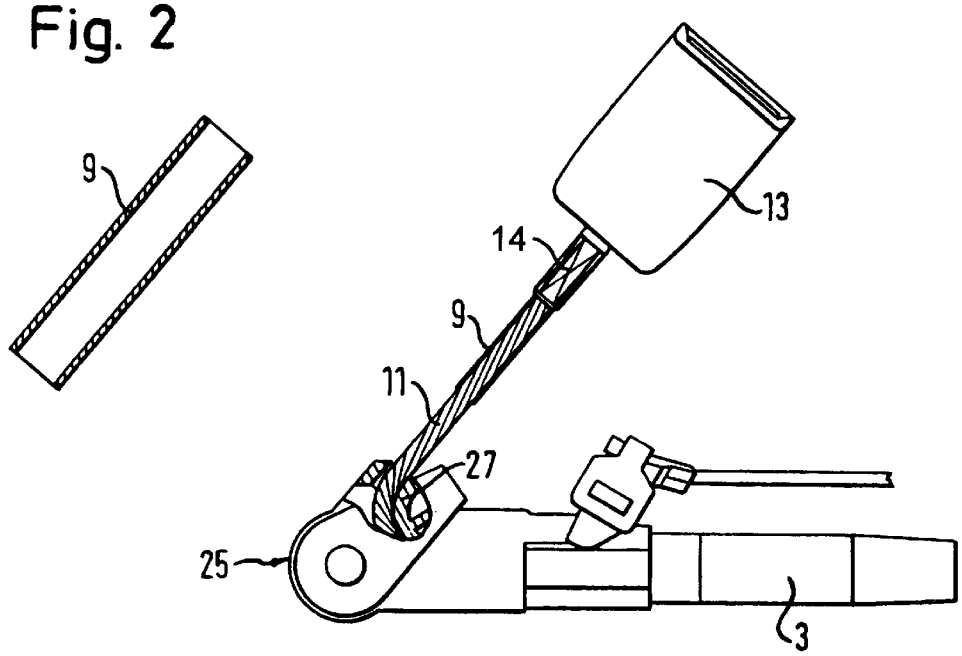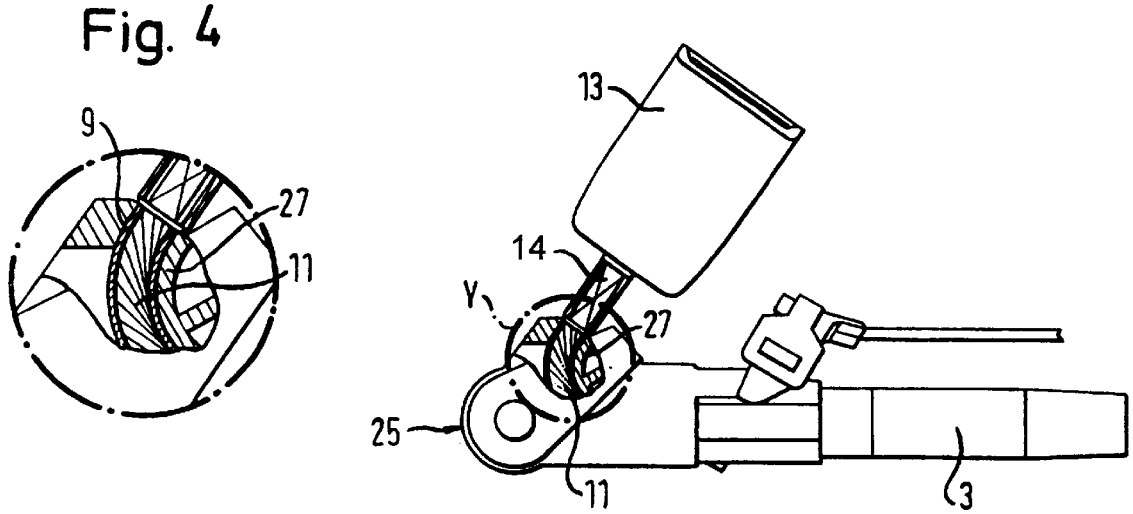

OCCUPANT RESTRAINT SYSTEM WITH A BELT PRETENSIONER

TECHNICAL FIELD

The invention relates to a vehicle occupant restraint system with a belt pretensioner.

BACKGROUND OF THE INVENTION

Known vehicle occupant restraint systems which have a belt pretensioner are used for displacing a belt link element engaging the belt in case of an accident. The displacement of the belt link element is, when the belt pretensioner is activated, principally limited by the available travel of the belt pretensioner drive device, for example a piston/cylinder unit. The end of this travel is limited by a limit stop, and extremely high deceleration values occur when this limit stop is reached. All components of the system must be dimensioned for the related high loads.

An occupant restraint system which is known from DE 94 04 272.1 U1 comprises a belt pretensioner which displaces a belt buckle. The belt pretensioner is connected with the belt buckle via a tension cable and a sleeve arranged between one end of the tension cable and the belt buckle. In the event of a collision, the belt pretensioner pulls the belt buckle, and, therefore, the sleeve closer to a cable deflector. The sleeve impacts the cable deflector with its front face in the final phase of the movement of the belt buckle and is plastically deformed. This ensures that all moved parts are slowly retarded. However, since the sleeve is arranged between the end of the cable and the belt buckle, the dimension of the known vehicle occupant restraint system is large.

BRIEF SUMMARY OF THE INVENTION

The invention provides an occupant restraint system whose dimensions are reduced with respect to the known restraint system although providing for the same length of the restriction stroke.

The vehicle occupant restraint system according to the invention includes a belt pretensioner with a belt pretensioner housing, a belt link element with a housing, a tension transmission element coupling the belt pretensioner and the belt link element with each other, a tubular body which encompasses the tension transmission element outside the belt pretensioner housing, and a stationary counterpart. Said counterpart has a curved guide. The belt pretensioner displaces the belt link element via the tension transmission element in the event of a collision upon actuation of the belt pretensioner, so that the tubular body penetrates into the curved guide and is bent.

In this way, a simple, reasonably priced dampening effect is achieved by means of the plastically bendable tubular body which absorbs part of the kinetic energy of the moving parts in the course of its plastic deformation.

In accordance with a preferred embodiment, the tubular body adjoins the outer housing of the belt link element or is part of the housing. When the belt tensioner is actuated, the belt link element thus carries the tubular body into the curved guide where the body is deformed. If the tubular body is part of the outer housing, this also makes fewer parts necessary.

The belt link element is preferably designed as a belt buckle which the tubular body adjoins.

When the tubular body is spaced from the belt link element and is affixed to the tension cable, the tubular body can be arranged adjacent to the curved guide. By this arrangement it is ensured that the tubular body penetrates into the curved guide and does not strike against the stationary counterpart with its front face.

The belt link element can also comprise a rope socket which the tubular body adjoins in accordance with a further embodiment. This is advantageous, if the rope socket projects out of the outer housing of the belt link element.

To prevent the damping achieved by the tubular body from being limited or even completely absent at extreme temperatures, i.e. at temperatures above 80° C. and below −30° C., the tubular body is preferably made of aluminium or another light metal. Unlike aluminium or light metal, plastics, other elastic materials or other metals change their properties beyond the above-mentioned extreme temperatures so much that the desired damping effect does not take place to the desired extent. Aluminium or other light metal provides, in contrast to steel, for an effective dampening effect and an advantageous evolution of energy absorption over the deformation path.

Furthermore, the geometry of the tubular body is preferably selected in such a way that the deformation energy absorbed by it linearly increases over its deformation path. This favours a steady deceleration of the belt link element by the body in the final phase of the movement of the belt link element, thus preventing unwanted destruction of parts of the restraint system.

In accordance with further preferred embodiments, it is provided that the tubular body should have a steadily decreasing wall thickness. This geometrical form makes it particularly easy to ensure that the deformation energy which the body can absorb increases linearly over its deformation path.

BRIEF DESCRIPTION OF THE DRAWINGS

FIG. 1 shows a side view, partially cut away, of the occupant restraint system in accordance with the invention, in accordance with a first embodiment, FIG. 2 shows the tubular body used in the occupant restraint system in accordance with FIG. 1, FIG. 3 shows the occupant restraint system in accordance with FIG. 1 in actuated condition, FIG. 4 shows an enlarged view of the region marked Y of the occupant restraint system.

DETAILED DESCRIPTION OF PREFERRED EMBODIMENTS

Figure 5:
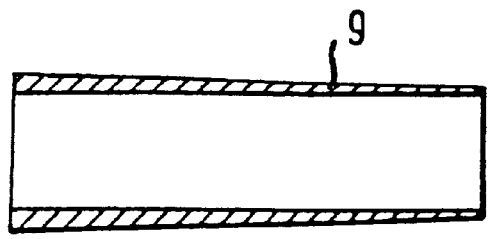
FIG. 5 shows a tubular tapered body which can be used in the occupant restraint system.

FIG. 1 shows an occupant restraint system comprising a belt pretensioner 3, which consists of a pyrotechnically actuatable piston/cylinder unit. A tension transmission element 11 in the form of a tension cable is connected at one free end to the piston of the piston/cylinder unit and at the opposite free end to a belt link element 13 in the form of a belt buckle. A cable deflector 25, which has a curved guide 27, is connected to the belt pretensioner 3. The tension transmission element 11 is bent by the guide 27 at an angle to the longitudinal axis of the belt pretensioner 3, so that the belt link element 13 stands upwards at an angle to allow the insertion tongue of the belt to engage more easily in the vehicle. Between the belt link element 13 and the belt pretensioner 3 is a tubular body 9, as shown in FIG. 2, arranged adjoining a housing extension 14 of the outer housing of the belt link element 13, wherein the tubular body 9 encompasses the tension transmission element 11. The tubular body 9 is made of aluminium or a light metal.

The body 9 can adjoin either the outer housing of the belt link element 13 can adjoin directly to, or the smaller-diameter housing extension 14 in accordance with FIG. 1, which covers a rope socket or directly a rope socket. Furthermore, however, it is also possible for the outer housing of the belt link element 13 to encompass the body 9 as well, so that the parts marked 13, 14 and 9 in FIG. 1 are connected with each other to form one piece.

The tubular body 9 does not necessarily directly adjoin the outer housing of the belt link element 13 but may define part of the latter. Unlike the body 9 in accordance with FIG. 2, the body 9 shown in FIG. 5 has a steadily decreasing wall thickness to thereby amend the evolution of the dampening which is to be achieved by the plastic deformation of the body 9.

The functioning of the occupant restraint system will now be explained with the help of FIG. 1. In the event of a collision, the belt pretensioner 3 is actuated, and the piston contained therein pulls the belt link element 13 over the tension transmission element 11, closer to the cable deflector 25. Since the body 9 adjoins the housing extension 14, the belt link element 13 carries the tubular body 9 in this movement, and the body is thus drawn into the cable deflector 25 (FIG. 3) and bent by the guide 27. The curved guide 27 has a funnel-shaped opening in the direction of the belt link element 13 to facilitate penetrating of the tubular body. This ensures that all moved parts are no longer retarded abruptly, but slowly, thus avoiding material breakage, for example destruction of the tension transmission element 11 or of the belt link element 13.

By providing a suitable wall thickness and wall geometry with respect to the geometry of the guide 27, a linear increase in deformation energy, which can be particularly exactly predetermined, over the deformation path of the body 9 can be achieved.

Other curves of absorbable deformation energy over the deformation path can be achieved using bodies with different geometries, for example bodies.

The damping options for occupant restraint systems described above make these systems only slightly more expensive and have no disadvantageous effects on the necessary construction space.

Figure 6:
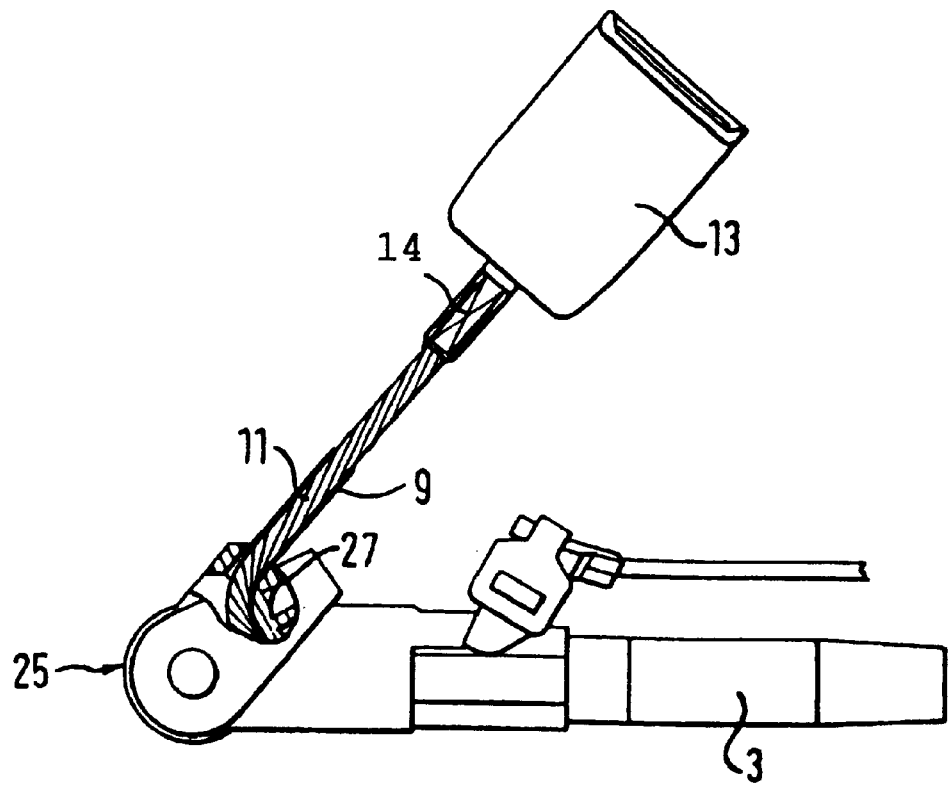
FIG. 6 shows a side view of an occupant restraint system in accordance with a second embodiment.

In the embodiment shown in FIG. 6, the tubular body 9 is spaced from the belt link element 13 and the housing extension 14. The tubular body 9 is attached to the tension transmission element 11 and is forced into the curved guide 27 upon actuation of the belt pretensioner.

I claim:

1. Vehicle occupant restraint system, including a belt pretensioner with a belt pretensioner housing, a belt link element with a housing, a tension transmission element coupling said belt pretensioner and said belt link element with each other, and a dampening means in the form of a tubular body encompassing said tension transmission element outside said belt pretensioner housing and being coupled with said tension transmission element, and a stationary counterpart having a curved guide for receiving said tubular body, said belt pretensioner displacing said belt link element and said tubular body via said tension transmission element in the event of a collision upon activation of said belt pretensioner so that said tubular body penetrates into said curved guide and is bent around said curved guide.

2. Vehicle occupant restraint system in accordance with claim 1, wherein said tubular body adjoins the housing of the belt link element.

3. Vehicle occupant restraint system in accordance with claim 1, wherein said tubular part is part of said housing of said belt link element.

4. Vehicle occupant restraint system in accordance with claim 1, wherein said tubular body is spaced from said belt link element and attached to said tension transmission element.

5. Vehicle occupant restraint system in accordance with claim 1, wherein said belt link element comprises a belt buckle and said tubular body adjoins said belt buckle.

6. Vehicle occupant restraint system in accordance with claim 1, wherein a rope socket is provided for attaching said belt link element to said tension transmission element, said tubular body adjoining said rope socket.

7. Vehicle occupant restraint system in accordance with claim 1, wherein said tension transmission element is a tension cable.

8. Vehicle occupant restraint system in accordance with claim 1, wherein said tubular body is made of aluminum or light metal.

9. Vehicle occupant restraint system in accordance with claim 1, wherein said tubular body is deformed along a deformation path, said tubular body absorbs energy by its deformation and geometry of said tubular body is selected in such a way that said absorbed energy linearly increases over said deformation path.

10. Vehicle occupant restraint system in accordance with claim 1, wherein said stationary counterpart is part of a cable deflector.

11. Vehicle occupant restraint system in accordance with claim 1, wherein said tubular body has a section with steadily decreasing wall thickness.

12. A vehicle occupant restraint system comprising:

a belt link element with a housing;

a belt pretensioner for moving the belt link element in a first direction, said belt pretensioner having a belt pretensioner housing;

a tension transmission element coupling said belt pretensioner and said belt link element together, said tension transmission element being movable relative to said pretensioner housing;

a stationary counterpart fixed relative to said pretensioner housing and having a curved guide for receiving a tubular body; and means for dampening movement of said belt link element in the first direction, said clamping means including a tubular body, said tubular body circumscribing said tension transmission element outside said belt pretensioner housing, said tubular body being coupled with said tension transmission element for movement therewith, said tubular body having a first end portion movable with said tension transmission element and said belt link element in the first direction and engageable with said curved guide, said first end portion of said tubular body being bendable upon engagement with said curved guide, said belt pretensioner moving said belt link element and said tubular body via said tension transmission element in the event of a collision upon actuation of said belt pretensioner so that said tubular body penetrates into said curved guide and wraps around said curved guide upon engagement with said curved guide.

* * * * *